United States Patent [19]

Shaw et al.

[11] Patent Number: 5,657,479

[45] Date of Patent: Aug. 12, 1997

[54] HIERARCHICAL DISPLAY LIST PROCESSING IN GRAPHICS DATA RETRIEVAL SYSTEM

[75] Inventors: Robert Allen Shaw, Los Altos; Peter R. Birch, San Francisco; John C. Lin, Cupertino, all of Calif.

[73] Assignee: Silicon Graphics, Inc., Mountain View, Calif.

[21] Appl. No.: 566,715

[22] Filed: Dec. 4, 1995

[51] Int. Cl.$^6$ ..................................................... G06F 13/00
[52] U.S. Cl. ........................... 395/526; 395/515; 395/511; 395/842; 395/844
[58] Field of Search .................................. 395/501, 502, 395/507, 511, 526, 522, 515, 421.02, 421.08, 842, 844, 846, 872, 873, 877

[56] References Cited

U.S. PATENT DOCUMENTS

| | | | |
|---|---|---|---|
| 4,312,066 | 1/1982 | Bantz et al. | 371/22.3 |
| 4,862,392 | 8/1989 | Steiner | 395/502 |
| 4,967,375 | 10/1990 | Pelham et al. | 395/515 |
| 5,018,079 | 5/1991 | Shukunami et al. | 364/106 |
| 5,020,003 | 5/1991 | Moshenburg | 364/511 |
| 5,058,042 | 10/1991 | Hanna et al. | 395/126 |
| 5,097,411 | 3/1992 | Doyle et al. | 395/526 |
| 5,179,658 | 1/1993 | Izawa et al. | 395/508 |
| 5,193,169 | 3/1993 | Ishikawa | 395/842 |
| 5,206,940 | 4/1993 | Murakami et al. | 395/421.08 |
| 5,251,303 | 10/1993 | Fogg, Jr. et al. | 395/844 |
| 5,291,582 | 3/1994 | Drako et al. | 395/525 |
| 5,333,290 | 7/1994 | Kato | 395/846 |
| 5,388,229 | 2/1995 | Hyouga et al. | 395/310 |

*Primary Examiner*—Kee M. Tung
*Attorney, Agent, or Firm*—Wagner, Murabito & Hao

[57] ABSTRACT

A hierarchical display list system and efficient processing method for same. The system provides a display list having discontiguous display list segments and an information retrieval system for same (e.g. DMA controller in one embodiment). Each display list segment (DLS) contains a call to a next to be processed DLS or a return. The call includes a push (which indicates the address of the return DLS) and also a jump control data (which indicates the address of the next to be processed DLS. The push and jump and also contain the length of the respective DLS's involved. DLSs can also contain return control data which include a POP and a jump. Nesting (e.g. the display list control path) is maintained by a display list stack. The discontiguous DLSs are separately stored in memory of the host processor. According to the system, the information for traversing the hierarchical display list is stored in the display list itself so the host processor is not required for display list processing aside from initializing the rendering procedure. In an improvement embodiment, the transfer control information (e.g., call and return) are placed in the front of the DLS so that the information retrieval system can initialize and set up for the control transfer in parallel while the current DLS is processed. This improvement provides faster control transfer between. DLSs and keeps the graphics FIFO substantially filled during the display list rendering process.

22 Claims, 16 Drawing Sheets

HIERARCHICAL DISPLAY LIST PROCESSING IN GRAPHICS DATA RETRIEVAL SYSTEM

BACKGROUND OF THE INVENTION (1) Field of the Invention

The present invention relates to the field of computer controlled graphics display systems. More specifically, the present invention relates to retrieval systems for graphics processors, such as graphics processors that use graphics data stored in display lists.

(2) Prior Art

Graphics displays systems typically include a host system and a graphics subsystem (including a graphics hardware unit, e.g., a "graphics generation" circuit) which can include an information retrieval subsystem. The information retrieval subsystem interfaces with memory to retrieve graphics information for rendering onto a display screen or other visualization device. This graphics information is typically stored in one or more display lists in memory, however some systems do not use display lists. Display lists of prior art graphics systems are stored in memory, accessed and processed using a variety of different formats. Graphics information stored within a display list usually contains many graphics primitives (e.g., polygons, lines, points, etc.) and/or graphics commands.

One type of graphics display mode that does not use display lists is referred to as graphics "immediate mode." In this mode, a host processor within a graphics system transfers each rendering command and/or graphics primitive or image to the graphics hardware unit in real time as the host processor determines the command and/or graphics primitive. The immediate mode does not require storage space for the display list since there is no display list stored in memory. The immediate mode also offers a great deal of flexibility in allowing the displayed images to be altered because each image when displayed is totally generated on the fly. However, the immediate mode is disadvantageous because during graphics rendering, a large amount of attention is required of the host processor thereby reducing the level of parallelism that would be otherwise offered by the hardware graphics unit. What is needed is a system that offers flexibility in altering an image but does not require a great deal of host processor attention.

A common format for display lists to adopt is a simple contiguous serial listing of display elements (e.g., graphics primitives or commands). For instance, if a house were to be displayed, its display list would contain the following display elements: a roof, a door, windows, grass, a garage, etc. In this mode, these elements are stored in contiguous memory space within the house display list and to generate a house, the host processor informs the graphics hardware unit where to look for the house display list and then the graphics hardware unit independently processes the house display list to render an image of the house on a display screen.

Although this method does not require very much interaction with the host processor (thus freeing the processor for other tasks), the simple contiguous serial display list is not easily modifiable, not even for small changes in the display list. If one small change is to be made, the entire display list must be regenerated and stored in memory since all the contents of the display list are contiguous. What is needed is a display list format that does not require much host processor interaction, yet is readily modifiable.

Another display format that uses display lists is the scatter gather mode. In this example, a display list is composed of a number of different discontiguous segments that are all "tied" together using a scatter gather table. In order to generate the image represented by the display list, the host processor reads each entry of the scatter gather table and directs the graphics hardware unit to process the display list segment corresponding to the current entry. Although this method requires less host processor attention over the immediate mode, it still requires the host processor's attention to queue up each display list segment. For display lists having hundreds of different segments, this requires the host processor's attention at least 100 different times during the rendering of a single image.

Further, the scatter gather mode while readily modifiable in terms of replacing one display list segment for another, is not well suited for processing images having duplicated patterns (which are common place in graphics images). Specifically, if an image requires many duplicated display patterns, such as windows in a house image, the scatter gather method requires a separate set of entries in the house display list for each window. Further, the scatter gather method is not well suited for display lists that need to be altered in order to add duplication in certain display patterns (which is often required by graphics systems). For example, if the house image needs to be modified, e.g., to represent three houses of a neighborhood, all of the scatter gather entries of the house display list need to be replicated three times in memory to provide the neighborhood display list. What is needed is a display system that requires little host processor attention, is readily modifiable, but does not require the type of information replication and degree of computer memory resource usage required of the scatter gather display mode.

Accordingly, the present invention offers a display list system that is readily modifiable so that display lists of one image can be altered to generate other images. Further, the present invention offers a display list system that requires very little host processor attention for image rendering. The present invention also offers the above advantages without requiring information replication of the kind required by the scatter gather display modes. Lastly, the present invention offers a display list system that is consistent with the way in which graphics designers and graphics display systems construct and utilize graphics information for display. These and other advantages of the present invention not specifically described above will become clear within discussions of the present invention herein.

SUMMARY OF THE INVENTION

A hierarchical display list system and efficient processing method for same are described herein. The system provides a display list having discontiguous display list segments and an information retrieval system for same (e.g. DMA controller in one embodiment). Each display list segment (DLS) contains a call to a next to be processed DLS or a return. The call includes a push control word (which indicates the address of the next-to-return DLS) and also a jump control word (which indicates the address of the next to be processed ("jump-to") DLS. The push and jump and also contain the length of the respective DLSs involved. DLSs can contain a return control which includes a pop and a jump. Nesting (e.g. the display list control path) is maintained by a display list stack. The discontiguous DLSs are separately stored in memory of the graphics system. According to the system, the information for traversing the hierarchical display list is stored in the display list itself so the host processor is not required for display list processing aside from initializing the rendering procedure.

The display list of the present invention is consistent with the methods used by graphics designers to construct images in that a single image is typically constructed of simpler images that can be linked and repeated. The present invention display list is readily modifiable since any DLS can be altered and reinserted into the display list, or removed completely, with the appropriate transfer information placed in the remaining DLSs of the display list. Further, with little overhead, an entire display list can be repeated many times by adding the appropriate calling structures in the front the display list. In an improvement embodiment, the transfer control information (e.g., call and return) are placed in the front of each DLS so that the information retrieval system can initialize and transfer data in parallel while the current DLS is processed for display. This improvement provides faster control transfer between DLSs and keeps the graphics FIFO substantially filled during the display list rendering process.

More specifically, embodiments of the invention include in a graphics display system having a host processor, a memory transfer engine, a graphics generator circuit, a memory unit, and a stack, a method for reading a display list comprising the steps of: (a) retrieving an input display list segment of the display list from the memory unit, the display list comprising a plurality of display list segments linked together under a hierarchical acyclic directed graph format, the step of retrieving using the memory transfer engine; (b) interrogating the contents of the input display list to locate control data therein, the control data comprising either a call control data or a return control data; (c) if the control data includes the call control data, (1) pushing an address and length of a next-to-return display list segment from the call control data onto a stack memory and (2) transferring an address and length of a jump-to display list segment from the call control data to the memory transfer engine; and (d) if the control data includes a return control data word, (1) popping an address and length of a return display list segment from the stack memory and (2) transferring the address and length of the return display list to the memory transfer engine.

Embodiments of the invention include the above and wherein the control data is located at the end of each of the plurality of display list segments of the display list and further comprise the steps of: supplying information from the input display list segment to a graphics generation circuit for visualization; and initializing retrieval of the jump-to display list segment using the memory transfer engine upon receiving the address and length of the jump-to display list segment, wherein the above step of supplying and the above step of initializing operate in parallel. The invention also includes a system implemented in accordance with the above.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details or with certain alternative equivalent circuits and methods to those described herein. In other instances, well known methods, procedures, components, and circuits have not been described in detail as not to unnecessarily obscure aspects of the present invention.

HARDWARE PLATFORM OF THE PRESENT INVENTION

Figure 1:
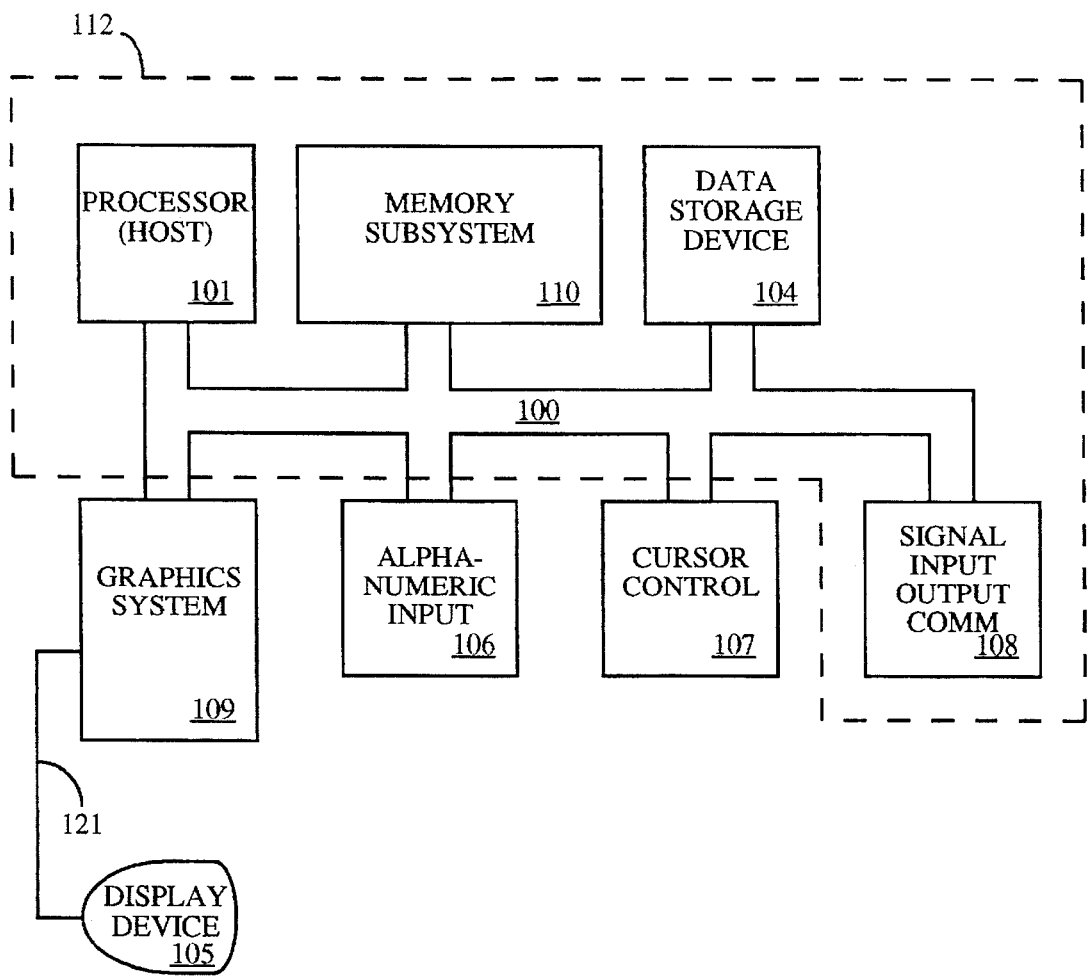
FIG. 1 is a high level block diagram of a computer controlled graphics display system in accordance with the present invention.

The present invention graphics display system 125 capable of processing hierarchical display lists in memory is shown in FIG. 1. System 125 includes a host computer platform 112, a graphics subsystem 109 and various user interface circuitry 106 and 107. It is appreciated that a number of different well known host computer system platforms can operate within the scope of the present invention and the platform 112 shown in FIG. 1, and described below, is exemplary.

Host computer system 112 used by the preferred embodiment of the present invention includes a bus 100 for communicating information. Bus 100 can be an address/data bus.

In one implementation, a GIO64 bus is utilized which is 8 bytes wide and operates at 33 MHz and uses a 32 bit physical address, although other bus designs can also be used. System 112 includes a processor 101 which in one implementation can be either an R4000 central processor running at 50 MHz external (100 MHz internal) or can be an R4400 central processor running at 75 MHz external (150 MHz internal). The processor 101 is coupled to the bus 100 and is used for processing graphics information and graphics instructions from the host system 112. In one implementation, the processor 101 is capable of 64-bit accesses.

Figure 2:
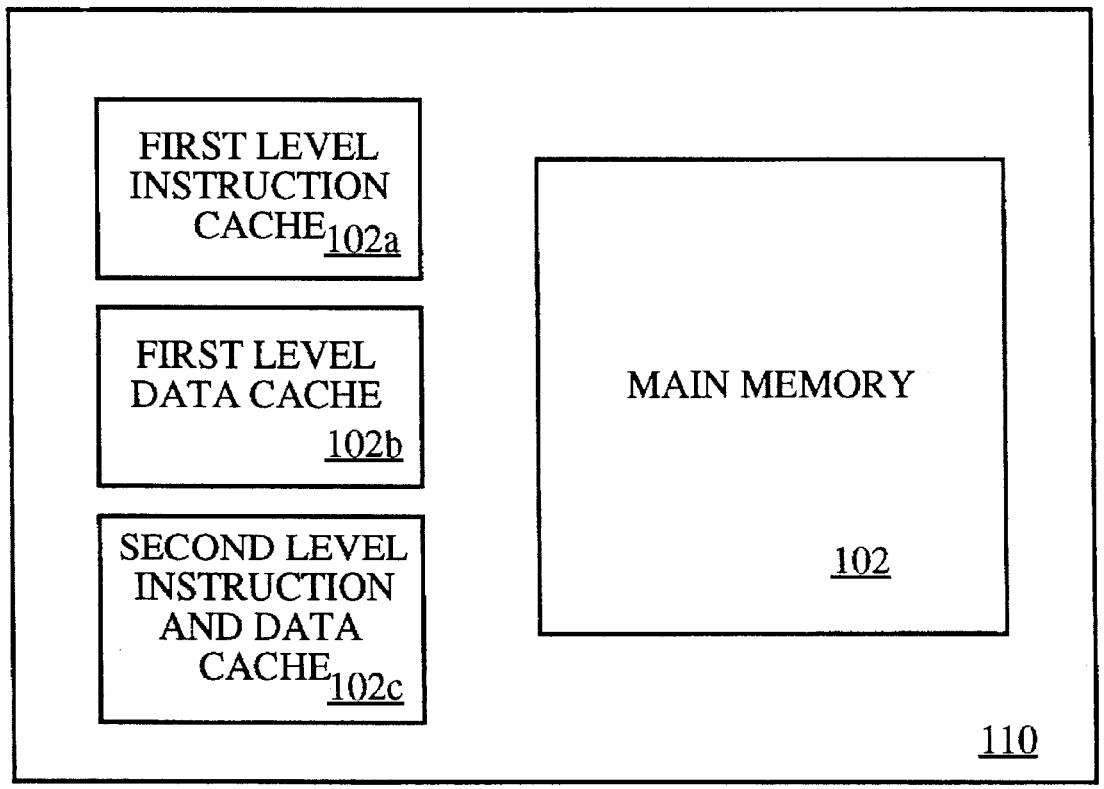
FIG. 2 illustrates components of the memory subsystem of the present invention.

System 125 of FIG. 1 also includes a memory subsystem 110 coupled to bus 100 which contains main memory, including a read/write memory, and several caches (FIG. 2). The memory subsystem 110 stores display list segments for the hierarchical display list (HDL) of the present invention. HDLs of the present invention are stored in memory subsystem 110 by the host system 112 and can be automatically retrieved by the graphics subsystem 109. Memory subsystem 110 also stores instructions for processor 101. System 112 also includes a data storage device 104 such as a magnetic or optical disk and disk drive coupled with the bus 100 for storing information and instructions. System 112 can also contain a display device, but typically the display device 105 is coupled directly to the graphics subsystem 109 via bus 121 as shown in FIG. 1. The display device 105 is used for displaying information to the computer user, such as the contents of the HDLs of the present invention.

System 125 also includes an optional alphanumeric input device 106 (e.g., "keyboard") including alphanumeric and function keys coupled to the bus 100 for communicating information and command selections to the processor 101. Also optionally coupled to bus 100 is a cursor control device 107 used for communicating user input information and command selections to processor 101. A signal generating device 108 can optionally be coupled to the bus 100 for communicating command selections to and from the processor 101 between an external computer system.

The display device 105 of FIG. 1 utilized with the graphics display system 125 of the present invention can be a liquid crystal device, cathode ray tube, or other display device suitable for creating graphic images and alphanumeric characters recognizable to the user. The optional cursor control device 107 allows the computer user to dynamically signal the two dimensional movement of a visible symbol (pointer) on a display screen of the display device 105. Many implementations of the cursor control device are known in the art including a trackball, mouse, joystick or special keys on the alphanumeric input device 105 capable of signaling movement of a given direction or manner of displacement. It is to be appreciated that the cursor means 107 also may be directed and/or activated via input from the keyboard using special keys and key sequence commands.

The graphics subsystem 109, is used to rapidly process graphics information stored in the form of an HDL of the present invention for rendering on display screen 105. The graphics subsystem 109 is described with reference to FIG. 3. The display list segments of the HDL typically comprise graphics commands and/or graphics primitives. In one implementation, a primitive is composed of vertices, each vertex having 4 32-bit words for x, y, and z (location) and w (screen attribute) as well as 1 64 bit word for a command.

With reference to FIG. 2, the memory subsystem 110 of FIG. 1 is shown in more detail. A main read/write memory 102 is included in system 110 and this main memory can be implemented using random access memory (RAM), or any other suitable read/write storage media (e.g., flash memory, EEPROM, etc.). Although not shown, a read only memory (ROM) can also be included in memory subsystem 110. Memory subsystem 110 also contains a first level instruction cache 102a and a first level data cache 102b. In one implementation, the instruction cache 102a and the data cache 102b are each 8 KB. A second level instruction and data cache 102c is also used. In one implementation, this cache 102c is 1 MegaB in size. The above cache sizes can be larger or smaller within the scope of the present invention and can also be merged into one cache unit without departing from the present invention. Specifically, in one implementation, the contents of the first level caches 102a and 102b are a subset of the contents of cache 102c. The caches can be direct mapped (e.g., using single set associative) and write-back. The configuration of the line sizes of the above cache units can vary within the present invention.

Figure 3:
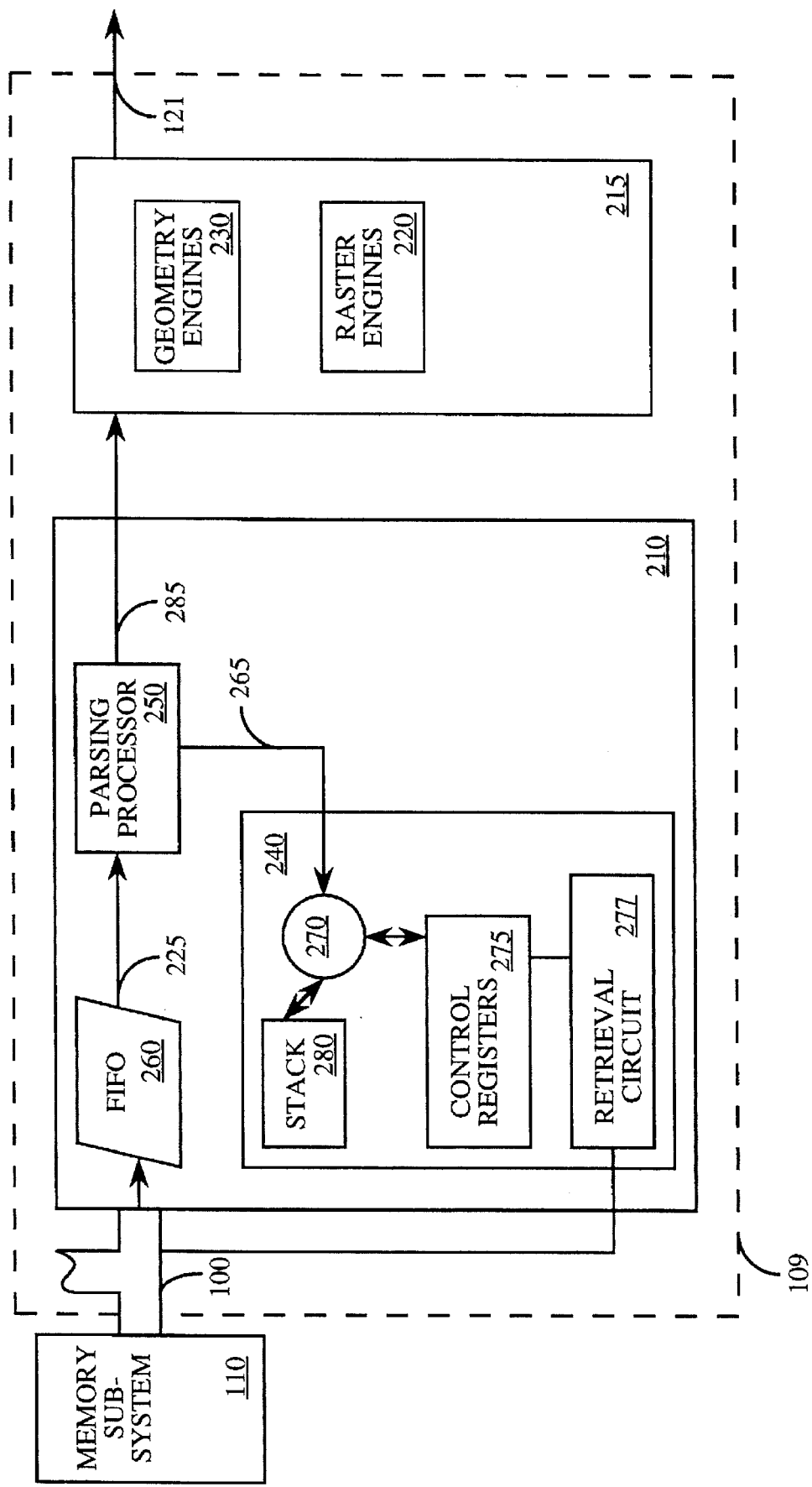
FIG. 3 is a block diagram illustrating an information retrieval system of the present invention including interfaces to the memory subsystem and to geometry and raster engines.

With reference to FIG. 3, elements of graphics subsystem 109 are illustrated in more detail. Graphics subsystem 109 is coupled to retrieve graphics information (e.g., from an HDL) over bus 100 from the memory subsystem 110. For this reason, the graphics subsystem 109 contains an information retrieval system 210. Information retrieval system 210 is coupled to supply graphics information to a set of geometry engines 230 and raster engines 220 which are used to process the graphics information (e.g., graphics primitives and/or other graphics commands) to generate or "render" an image on display screen 105 for visualization. Geometry engines 230 and raster engines 220 are specially adapted and high speed hardware circuits situated within a graphics rendering or generation block 215. A number of different and well known geometry engines 230 and raster engines 220 can be used within the present invention.

Information retrieval system 210 of FIG. 3 contains an input FIFO (first-in-first-out) memory unit 260 which receives graphics information from bus 100. The size of the FIFO memory unit 260 can vary within the scope of the present invention. The FIFO memory unit 260 is coupled to supply information over bus 223 to a parsing unit or processor 250. Display list accessing is initiated by commands sent from processor 101 to the FIFO memory unit 260. Once the DMA engine 240 starts processing the display list, processing of commands from the processor 101 ceases until the display list is complete.

Parsing processor 250 examines or interrogates the graphics information within FIFO 260 to locate and forward control data within the graphics information. Control data that are located are forwarded to a DMA engine 240 for processing. Other graphics information (e.g., graphics primitives and/or other graphics rendering commands) are forwarded from the parsing processor 250 over bus 285 to the graphics rendering or generation block 215 for display. A number of well known parsing processors can be used to recognize the control data of the present invention. Graphics rendering or generation block 215 is coupled to supply output to display device 105 (FIG. 1) via bus 121.

The DMA engine 240 performs memory access to the memory subsystem 110 and in one implementation performs bus cycle stealing from the processor 101, but need not in other implementations. The DMA engine 240 can be implemented using a number of different memory transfer engines and formats that are well known in the art and the DMA implementation shown in FIG. 3 is exemplary. The purpose of the DMA engine 240 is to retrieve display list segments (DLSs) from memory subsystem 110 which supplies the segments to information retrieval system 210. Given the start address and length of a DLS, the DMA engine 240 can retrieve the DLS from memory. The DMA engine 240 includes a display list stack (DLstack) 280 which is a memory unit coupled to control circuitry 270. The DLstack 280 can be a separate unit of hardware or can be a dedicated region of memory 102. In one implementation, the DLstack 280 depth is typically 8 entries to handle 8 levels, but the size of the stack can be larger or smaller with the present invention. However, typical HDLs have between 4–16 levels only. A set of control registers 275 is also coupled to the control circuitry 270. A retrieval circuit 277 is also coupled to the control registers 275 (and can also be coupled to the control circuitry 270).

The retrieval circuit 277 of FIG. 3 in one implementation operates using well known DMA techniques and when given: (1) a start address or reference for a DLS; and (2) the length of the DLS, accesses the specified DLS from memory subsystem 110 which supplies the information over bus 100. In order to access the specified DLS, certain initializations are performed including: performing command interpretations; determining and setting registers in block 275; performing address translations; and performing bus access requests. These functions are performed by circuit 270 of block 240 using a number of well known DMA procedures and circuits. In order to control the memory subsystem 110, retrieval circuit 277 is coupled to bus 100 via signal bus 241.

In operation, control data encountered by parsing processor 250 is forwarded to control circuitry 270 which interprets the control data and responds thereto. Depending on the control data, as described further below, information is pushed or popped from the DLstack 280 and control registers are set within block 275. Depending on the information set in block 275, the retrieval circuit 277 commences initializing the retrieval of a DLS and when the FIFO memory unit 260 has an empty entry, circuit 277 commences the transfer of the DLS from memory subsystem 110 to the FIFO memory unit 260.

HIERARCHICAL DISPLAY LISTS OF THE PRESENT INVENTION

Figure 4A:
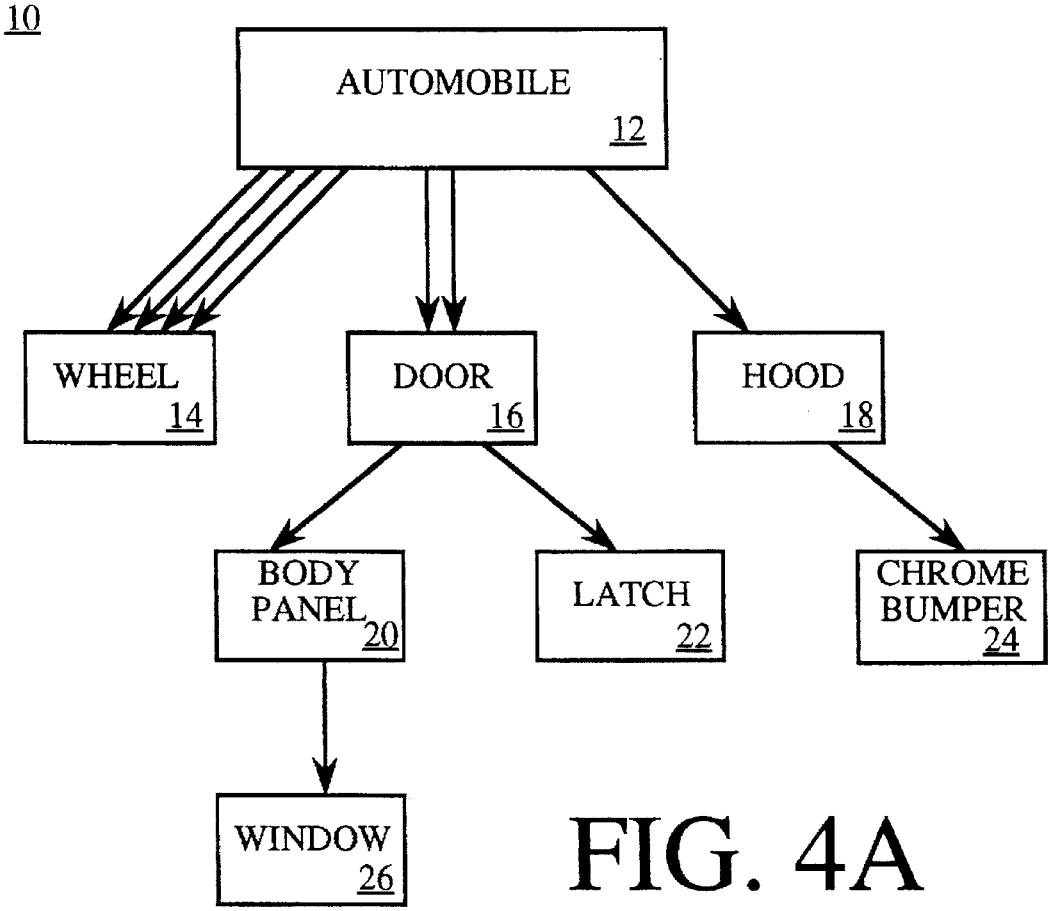
FIG. 4A illustrates display list segments (DLSs) of a display image in accordance with the hierarchical display list format of the present invention.

With reference to FIG. 4A, a hierarchical display list (HDL) 10 in accordance with the present invention is shown. The HDL 10 is composed of different graphics elements (e.g., 14, 16, and 18) which can also be composed of individual subelements themselves (e.g., 20 and 22). The HDL 10 is modeled after a directed acyclic graph in that the graph allows control flow (e.g., arrows) to join, but there are no loops allowed in the HDL 10. In other words, the control flow is directed in a single direction (e.g., downward) in this example. The HDL 10 permits static sets of commands (e.g., a geometric description of a particular object) to be reused from frame to frame or repeated within a frame.

The HDL 10 of the present invention is advantageous because it offers an image storage approach that is consistent with the way in which graphics designers approach display problems and display images. In effect, the HDL 10 of the present invention provides a graphics information storage approach that allows "subroutining" of the graphics data. For example, the exemplary HDL 10 of FIG. 4 represents a description of an automobile which is represented by DLS 12. The DLS 12 can call a number of different DLS used to render an image of the automobile. Four calls are made to a wheel DLS 14. Fifth and sixth calls are then made to the door DLS 16 and a last call is made to the hood DLS 18. All call and return information is embedded in the DLSs of the HDL 10.

In accordance with the present invention HDL 10 of FIG. 4A, the door DLS 16 is further divided into (1) a body panel DLS 20, which generates the body panel surface of the door, and (2) a latch DLS 22. The latch DLS 22 represents the door handle. The body panel DLS 20 calls a window DLS 26. Although the image of the automobile will contain (possibly obscured) image of four wheels and two doors, the present invention does not need to include duplicates of the same DLSs to generate the same or similar graphics elements represented by DLS 14 and 16.

As will be described further below, the DLSs of HDL 10 of FIG. 4A each include control data that direct the retrieval system 210 (FIG. 3) to obtain the next required DLS. According to FIG. 4A, at the completion of a particular DLS, another DLS will be called by the control data, or a return is performed to transfer control back to the calling DLS. In this way, the HDL 10 of the present invention can be advantageously walked by the graphics subsystem 109 of the present invention.

An advantage of the HDL 10 of the present invention is that graphics information duplication is reduced in that any DLS can call another DLS for execution a number of times while only one copy of the required DLS is stored in memory subsystem 110. Further, the processor 101 is not required to process the HDL 10 of the present invention because, as shown further below, the control data is completely contained within the HDL 10 data structure. Therefore, the processor 101 need only initialize the start of the HDL 10 (e.g., start of DLS 12) and the remaining control data comes from the HDL 10 itself and is processed by the information retrieval system 210 without processor 101 attention. Also, individual DLSs of HDL 10 can readily be modified or eliminated because the DLSs are not contiguous but occupy individual locations of the memory subsystem 110 (see FIG. 5). When an individual DLS or a group are modified or eliminated, minor changes in the control data of the HDL are only needed to complete the new HDL 10. Most of the HDL 10 can remain unaltered in memory subsystem 110 during the above change.

Figure 4B:
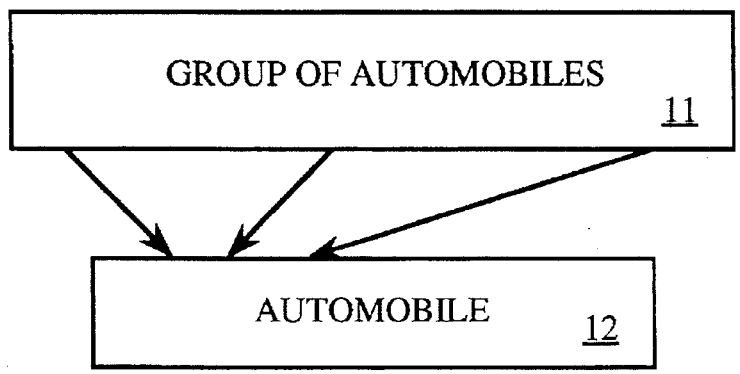
FIG. 4B illustrates a hierarchical display list of the present invention that replicates the hierarchical display list of FIG. 4A a number of times.

Lastly, the image represented by HDL 10 of the present invention can readily be duplicated without requiring duplication of all of the graphics information of HDL 10. For instance, FIG. 4B illustrates a modified HDL 10' of a group of automobiles that includes three images of the DLS 12 of FIG. 4A. In order to generate an image of the automobile as represented by DLS 12, the group of automobiles DLS 11 calls DLS 12 three times to generate three images, however, only one copy of the graphics information represented in HDL 10 is stored in memory subsystem 110.

Figure 5:
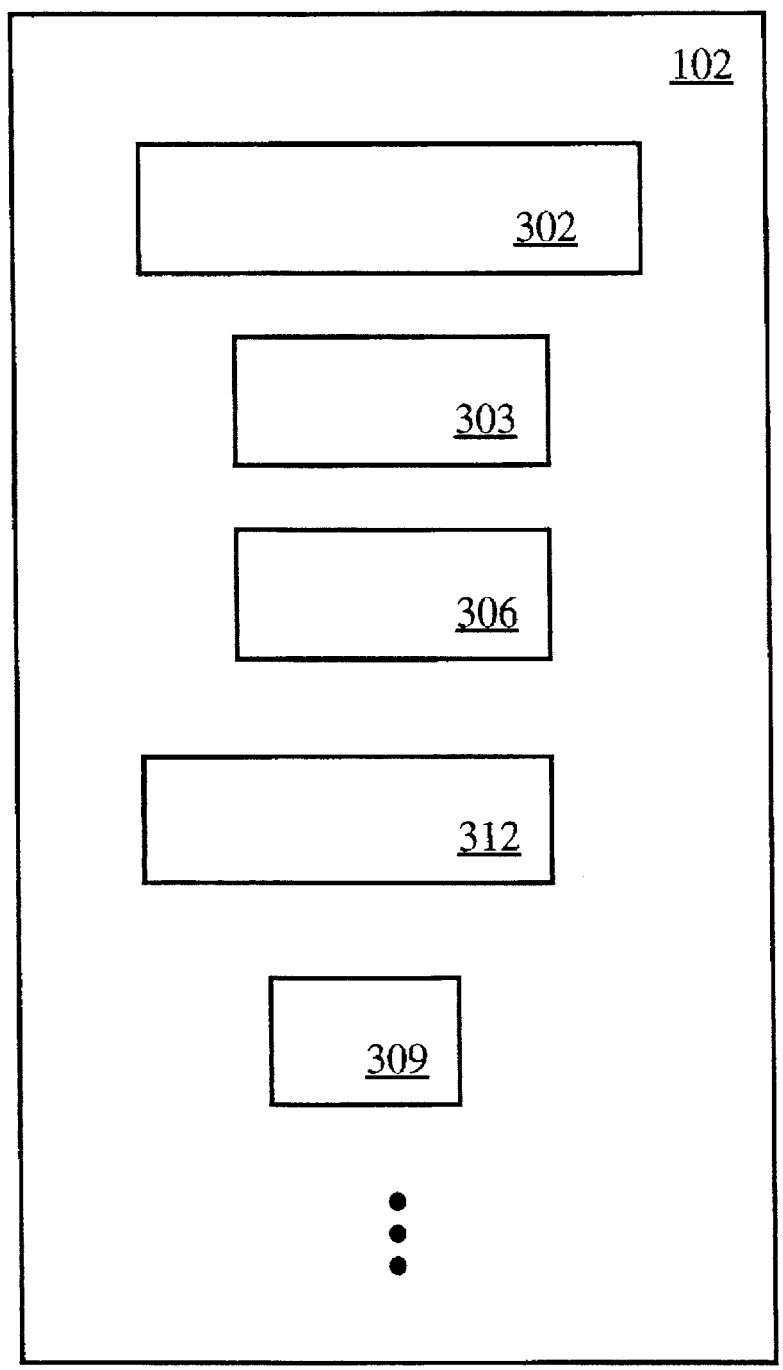
FIG. 5 is an illustration of an exemplary memory mapping of individual display list segments (DLSs) in accordance with the present invention.

With reference to FIG. 5, the DLSs of the present invention are individually stored in memory 102 in a discontiguous fashion. FIG. 5 shows some exemplary storage locations in memory 102 for DLS 302, 303, 306, 312, and 309. Although stored discontiguous to each other, the words of an individual DLS are stored in contiguous memory addresses as shown in FIG. 5. Although shown as read/write memory 102, the DLS of the present invention can also be stored and retrieved from a nonvolatile memory medium (e.g., read only memory, PROM, storage 104, etc.). Since the contents of an individual DLS are stored in contiguous memory locations within the memory unit 102, each DLS is defined by (1) its starting address and (2) its length. In some applications, the DLSs of an HDL can be stored in ROM.

Figure 6A:
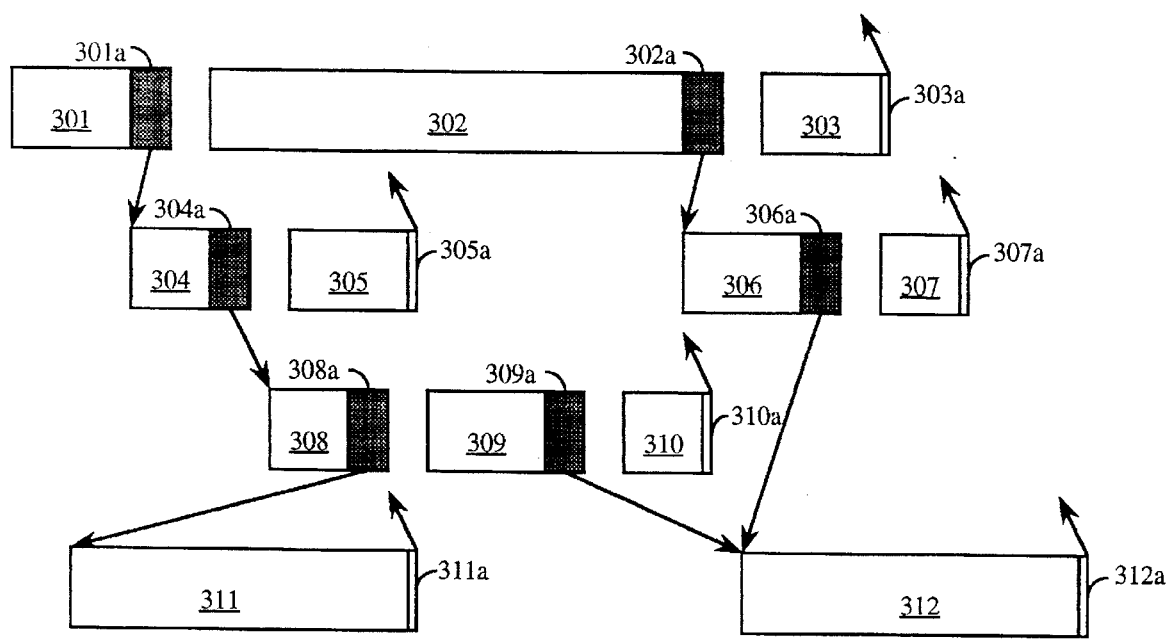
FIG. 6A illustrates an exemplary display list constructed in accordance with the hierarchical display list system of the present invention.

FIG. 6A illustrates another exemplary HDL 300 in accordance with the present invention having several levels. The storage locations in memory of some of the DLSs within HDL 300 are shown in FIG. 5. In this embodiment, control data are placed at the end of each DLS. The control data either indicates a call to another DLS or a return to a previous call location. Each call includes a push and a jump control data (e.g. a control byte or control words) as shown in Table I. The push control word indicates the address of the DLS that the called DLS will return to after completion (e.g. the "next-to-return" DLS). The jump control word indicates the address of the DLS to which control is passed on the call (e.g., the "jump-to" DLS). It is appreciated that the term "address" herein can refer to a physical address within memory subsystem 110 or can refer to a virtual address or reference address that requires translation in order to obtain the physical address. Circuit 240 performs the required translations, if any.

With reference to a return control data, each return includes a return control data (e.g., a control byte or control words) as shown in Table I which is interpreted to cause a pop and a jump action. The pop retrieves a DLS address for returning (e.g., the "return" DLS) and the jump is made to the retrieved DLS address. It is appreciated that processor 101 initiates display of HDL 300 by supplying the start address and length of the first DLS (e.g., 301) to the DMA engine 240 of graphics subsystem 109 and the processor 101 is not thereafter involved in the rendering of HDL 300.

TABLE I

Call/Return Control Data

Call Control Data

| PUSH |    ADDR OF NX-TO-RET DLS    LGTH OF NX-TO-RET DLS |
| JUMP |    ADDR OF JMP-TO DLS        LGTH OF JMP-TO DLS |

Return Control Data

| RETURN |    (ADDR and LGTH come from stack) |

It is understood that the address and length information of the return control word in Table I is not necessarily stored in the DLS but rather returned from the DLstack 280 and then used appropriately; the structure of Table I for the return control word merely shows the association of the data returned from the DLstack 280 with the pop and jump commands. It is appreciated that along with the DLS address stored in the stack during a call control data, the length of the DLS referenced by the DLS address can also be stored on the stack or can be stored in the DLSs themselves. Either approach is understood to be within the scope of the present invention.

With reference to FIG. 6A, several DLS are shown 301–312. The following DLSs have call control data: 301; 302; 304; 306; 308; and 309. The call control data is stored near the end of each DLS and is represented as shaded areas 301a; 302a; 304a; 306a; 308a; and 309a. The following DLSs have return control data: 303; 305; 307; 310; 311; and 312. The return control data is stored near the end of each DLS and is represented as areas 303a; 305a; 307a; 310a; 311a; and 312a. It is appreciated that the return 303a of DLS 303 completes the HDL 300.

Figure 6B:
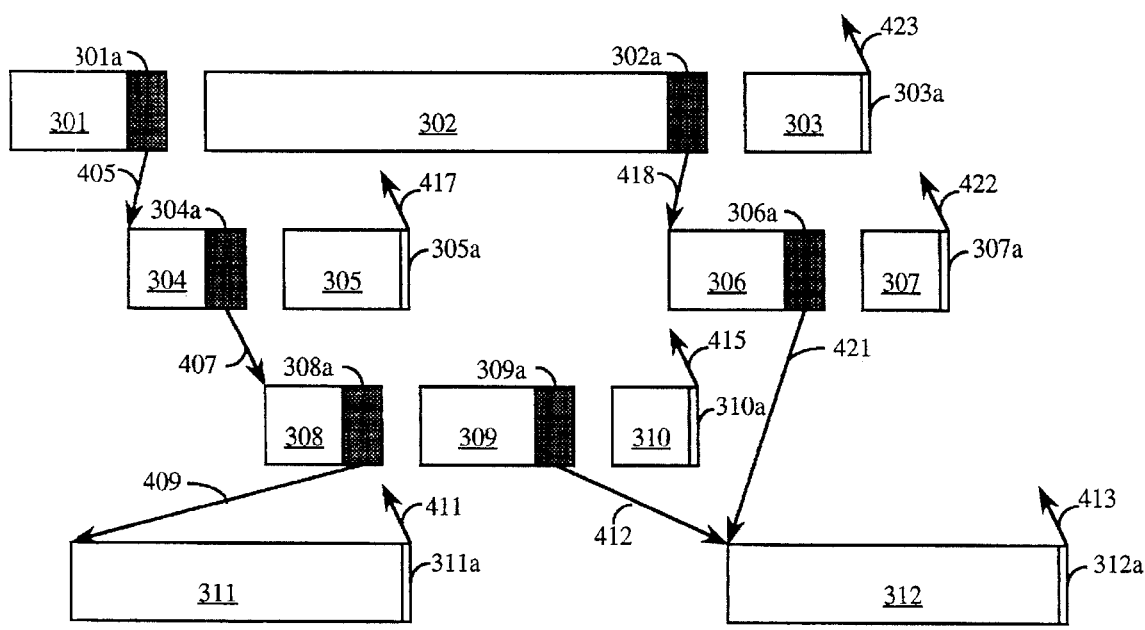
FIG. 6B illustrates an exemplary display list constructed in accordance with the hierarchical display list system of the present invention having labeled display list control flow directions.

With reference to FIG. 6B, the same HDL 300 of FIG. 6A is shown with each control flow indicated separately. Control data 301a indicates a call to DLS 304 as shown by control path 405. Control data 301a includes a push control data with the address of the next-to-return DLS 302 (AD302) and the length of the next-to-return DLS 302 (LG302) and also a jump control data with the address of the jump-to DLS 304 (AD304) and the length of the jump-to DLS 304 (LG304). Control data 302a includes a push of next-to-return DLS 303 (address and length) and a jump to the jump-to DLS 306 (address and length) as shown by control path 418. Control data 304a includes a push of next-to-return DLS 305 and a jump to the jump-to DLS 308 as shown by control path 407. Control data 308a includes a push of next-to-return DLS 309 and a jump to the jump-to DLS 311 as shown by control path 409. Control data 309a includes a push of the next-to-return DLS 310 and a jump to the jump-to DLS 312 as shown by control path 412. Control data 306a includes a push of next-to-return DLS 307 and a jump to the jump-to DLS 312 as shown by control path 421.

Figure 6C:
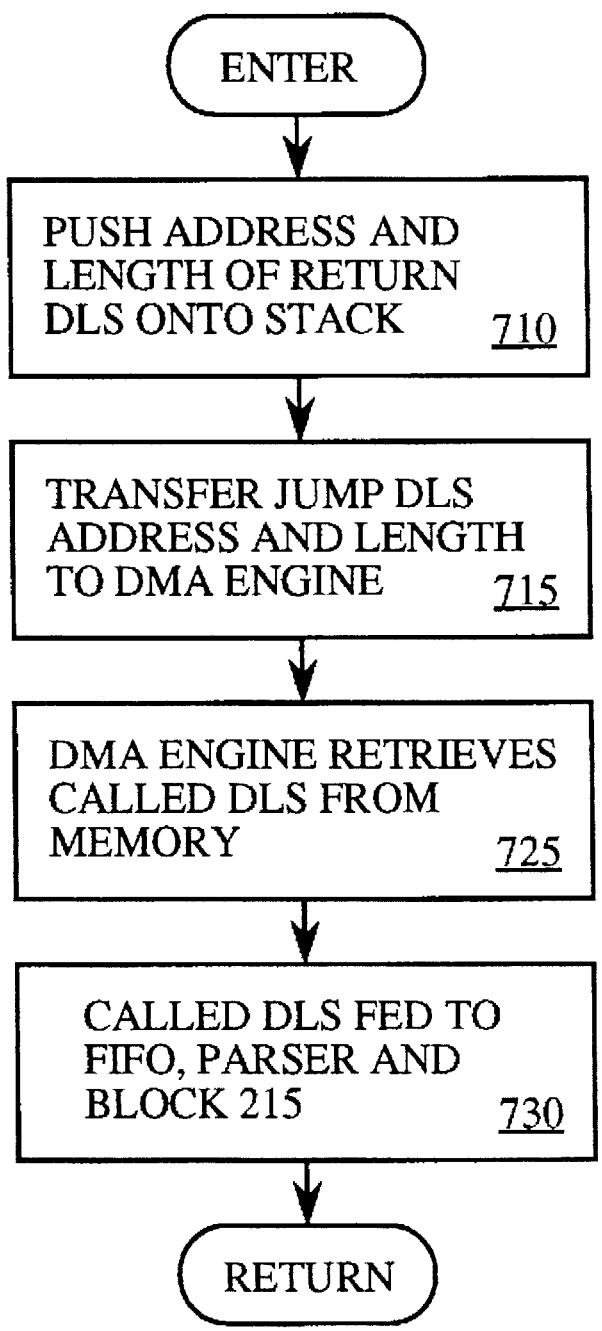
FIG. 6C is a flow diagram illustrating steps performed by the information retrieval circuit of the present invention for a call control data.

FIG. 6C illustrates a flow diagram of the steps 700 performed by the information retrieval system 210 (FIG. 3) of the present invention when encountering a call control data by parser 250. Parser 250 forwards the control data encountered to the control logic 270 for interpretation. A call control data is made up of a push control word and a jump control word. At block 710, circuit 210 (via logic 270) examines the push control word and pushes onto the DLstack 280 the address and length of the next-to-return DLS. In the exemplary case of control data 301a, block 710 pushes AD302 and LG302 onto DLstack 280. At block 715, circuit 210 (via logic 270) examines the jump control word and transfers the address and length of the jump-to DLS to the DMA engine 240. In the exemplary case of control data 301a, block 715 transfers AD304 and LG304 to the DMA engine 240. At block 725, the DMA engine 240 prepares the required data to retrieve the called DLS (e.g., DLS 304 in the exemplary case) and, via retrieval circuit 277, instructs the memory subsystem 110 to transfer the called DLS. At block 725, certain address translations are performed, bus requests are performed, control registers are set 275 and other DMA functions are performed by circuit 270. At block 730, the present invention receives the called DLS into FIFO memory unit 260 transfers the data into parsing processor 250 and to the graphics rendering or generation block 215. Further call control words in the called DLS will be processed according to process 700 and further return control words in the called DLS will be processed according to process 750 (FIG. 6D).

With reference to FIG. 6B, return control data 305a includes a pop which returns the address of return DLS 302 (AD302) and the length of DLS 302 (LG302) and a jump to DLS 302 based on this information. Control data 307a includes a pop of return DLS 303 and a jump to DLS 303. Control data 310a includes a pop of return DLS 305 and a jump to DLS 305. Control data 311a includes a pop of return DLS 309 and a jump to DLS 309. Control data 312a includes a pop of either DLS 310 or DLS 307 and a jump to either DLS 310 or DLS 307. Control data 303a indicates a return control data and the stack will be empty upon encountering this return control word thus indicating the end of the HDL 300.

Figure 6D:
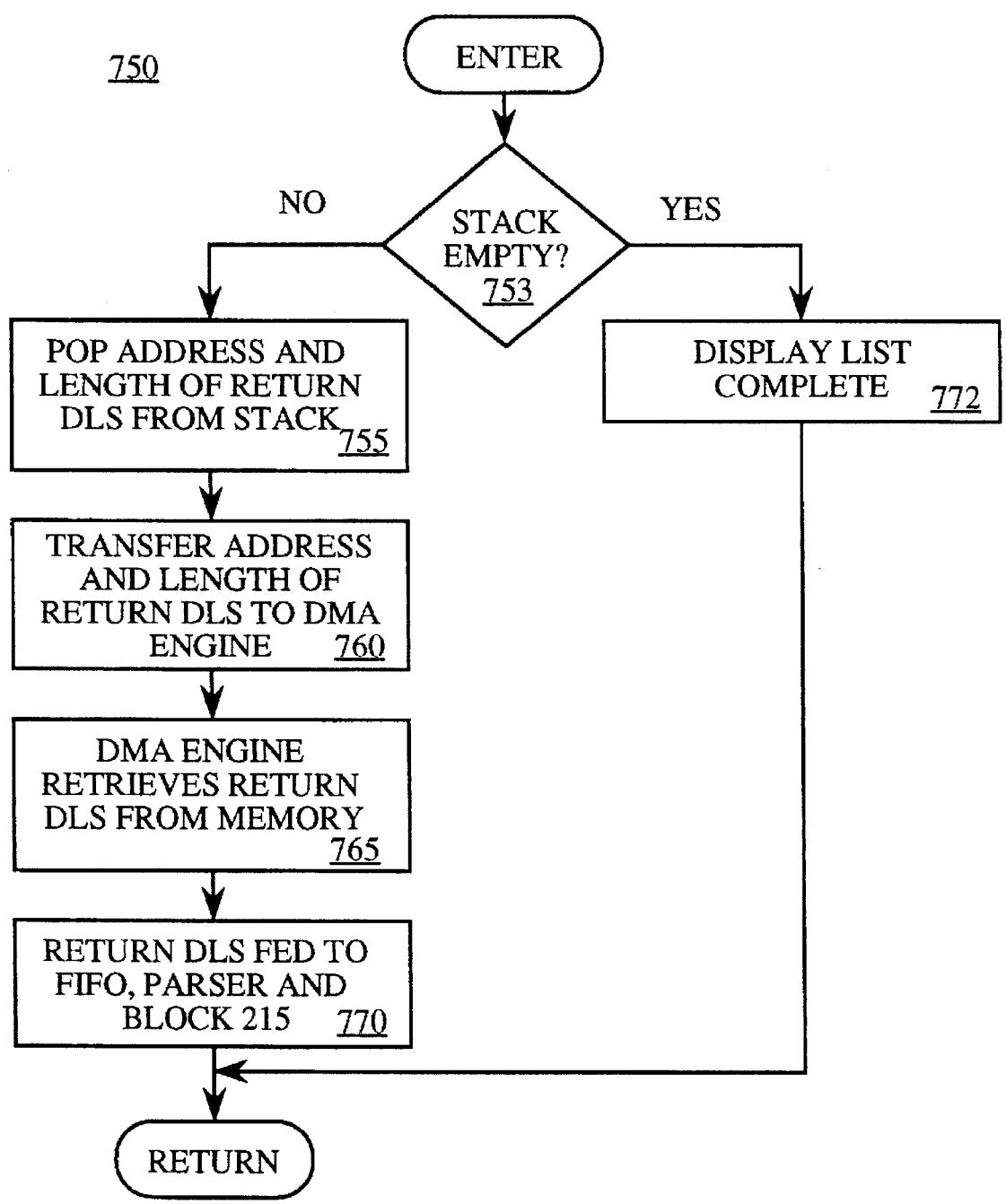
FIG. 6D is a flow diagram illustrating steps performed by the information retrieval circuit of the present invention for a return control data.

FIG. 6D illustrates a flow diagram of the steps 750 performed by the information retrieval system 210 (FIG. 3) of the present invention when encountering a return control data by parsing processor 250. Parsing processor 250 forwards the control data encountered to the control logic 270 for interpretation. A return control data is made up of a return control word which is interpreted as a pop and a jump. At block 753, the circuit 210 examines the stack to determine if it is empty. If so, then at block 772 processing for the current HDL is ended. If the stack is not empty, at block 755, circuit 210 (via logic 270) examines the return control word and pops from the DLstack 280 the address and length of the return DLS. In the exemplary case of control data 305a, block 755 pops AD302 and LG302 from DLstack 280. At block 760, circuit 210 (via logic 270) examines the return control word and transfers the address and length of the return DLS (popped off the stack) to the DMA engine 240. In the exemplary case of control data 305a, block 760 transfers AD302 and LG302. At block 765, the DMA engine 240 prepares the required data to retrieve the return DLS (e.g., DLS 302 in the exemplary case) and instructs the memory subsystem 110 to transfer the return DLS via retrieval circuit 277. At block 765, certain address translations are performed, bus requests are performed, control registers are set 275 and other DMA functions are performed by circuit 270. At block 770, the present invention receives the return DLS into FIFO memory unit 260 transfers the data into parsing processor 250 and to the graphics rendering or generation block 215. Further return control words in the return DLS will be processed according to process 750 and further call control words in the return DLS will be processed according to process 700.

Figure 7A:
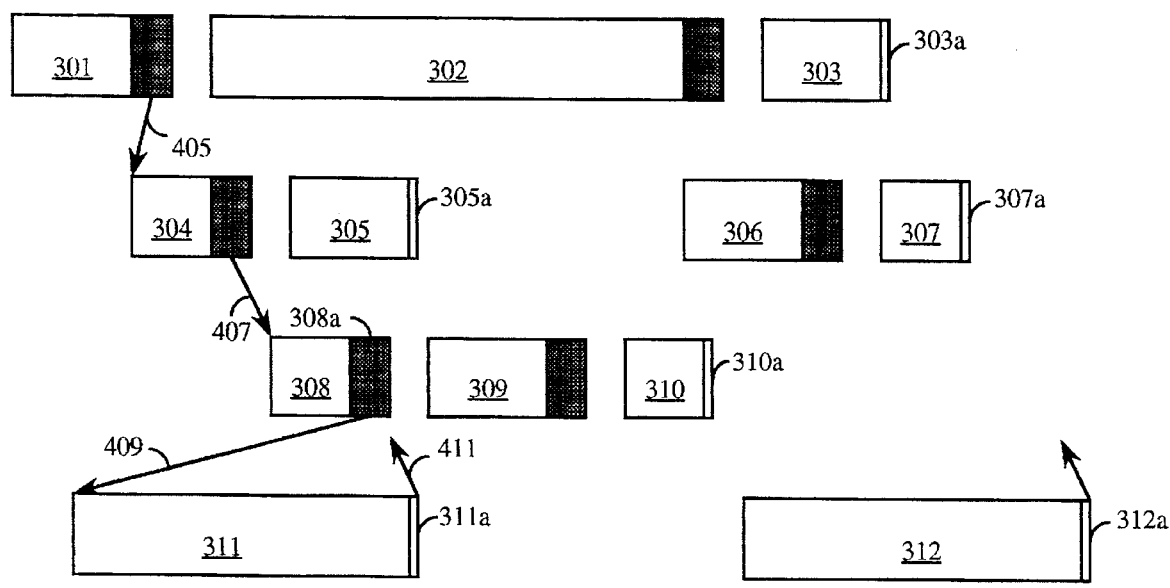
FIG. 7A illustrates an exemplary display list constructed in accordance with the hierarchical display list system of the present invention having only a portion of the display list control flow directions indicated.

As information is pushed onto the DLstack 280 of the present invention, the top of stack pointer in incremented so that the last data pushed onto the stack is the first data popped off of the stack. FIG. 7A illustrates HDL 300 in mid processing through the graphics subsystem 109 of the present invention. In the example herein, call 405 is performed, call 407 is performed, call 409 is performed and return 411 (represented by control word 311a) is starting to process.

Figure 7B:
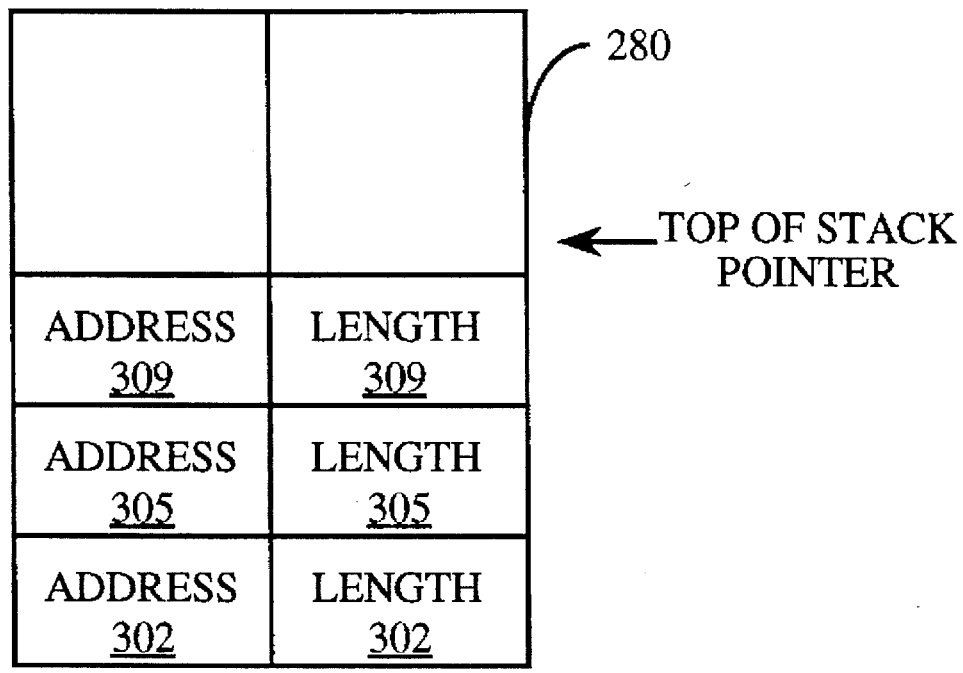
FIG. 7B is an illustration of the state of the display list stack of the present invention at the control flow state of FIG. 7A.

FIG. 7B illustrates the state of the DLstack 280 at the mid processing point indicated by FIG. 7A. As shown, the addresses and lengths of DLSs 302, 305 and 309 are stored in the DLstack 280 with the information pertinent to DLS 309 at the top of the DLstack 280. In this case, the return control word of return control data 311a will pop AD309 and LG309 from DLstack 280 and will perform a jump to access DLS 309 for processing. After the return control word, the top of stack pointer is decremented to indicate DLS 305.

It is appreciated that the above embodiment of the present invention alternatively can store the length of each DLS in the front portion of each DLS thus eliminating the need to include this information in the control data and therefore eliminating the need to store the length information in the DLstack 280.

Figure 8:
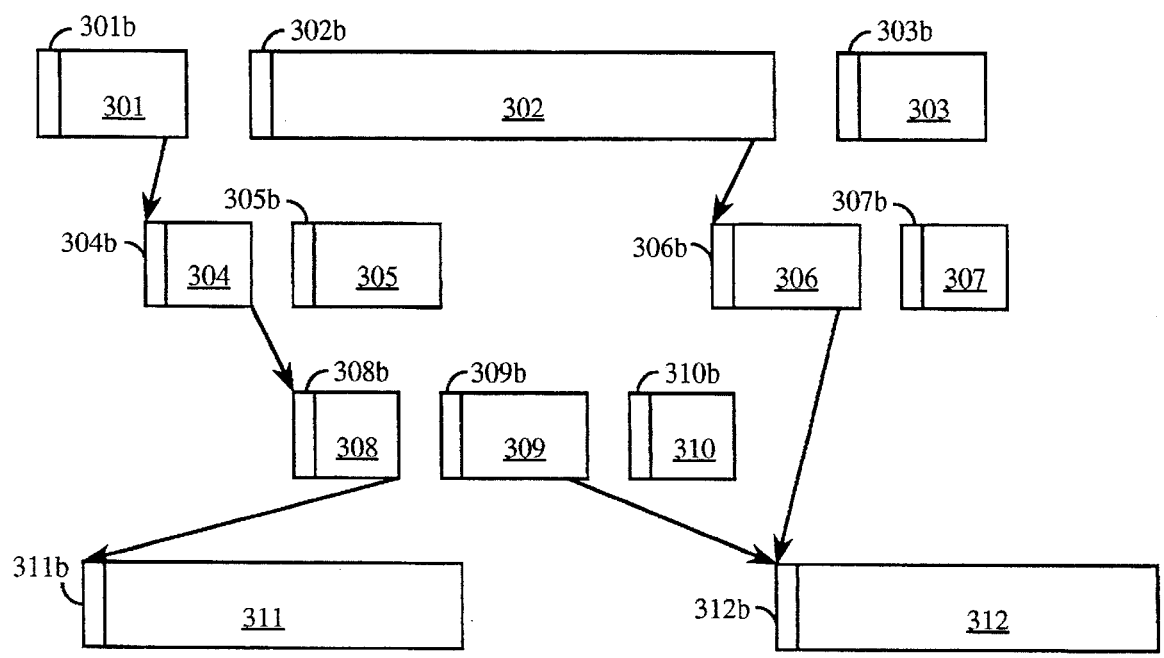
FIG. 8 illustrates an exemplary display list constructed in accordance with the hierarchical display list system of the present invention having transfer control information (e.g., call and return) located at the start of each DLS.

FIG. 8 illustrates an exemplary HDL 350 of an alternative embodiment of the present invention. In this embodiment, the control data for the DLS transfers are placed at the start of each DLS in lieu of placing the control data at the end of each DLS as done in the HDL of FIG. 6A. Control data is placed in the front of each DLS so that it can be processed in parallel by the DMA engine 240 of the present invention while the current DLS is being retrieved. This embodiment increases the available parallelism offered by the system 125 (FIG. 1) and reduces the time between the end of one DLS and the start of the next DLS.

In HDL 350, the DLSs: 301; 302; 304; 306; 308; and 309 have call control data: 301b; 302b; 304b; 306b; 308b; and 309b, respectively. Each call control word contains a push (of the next-to-return DLS) and a jump (to the jump-to DLS) control word. The DLSs: 303; 305; 307; 310; 311; and 312 have return call data (to the return DLS): 303b; 305b; 307b; 310b; 311b; and 312b, respectively. Each return control word performs a pop and a jump function. The call and return control data are located at the front of each DLS. For example, control data 301b contains a call control data including (1) a push of the address and length of the next-to-return DLS 302 and (2) a jump to the jump-to DLS 304 including the address and length of DLS 304. Also, control data 311b contains a return control data including (1) a pop of the return address and length (here the return DLS is DLS 309) and (2) a jump to the return DLS including the address and length of the return DLS. Similar to the embodiment of FIG. 6A, when return control data 303b is encountered, the DLstack 280 will be empty and the HDL 350 is complete.

Figure 10A:
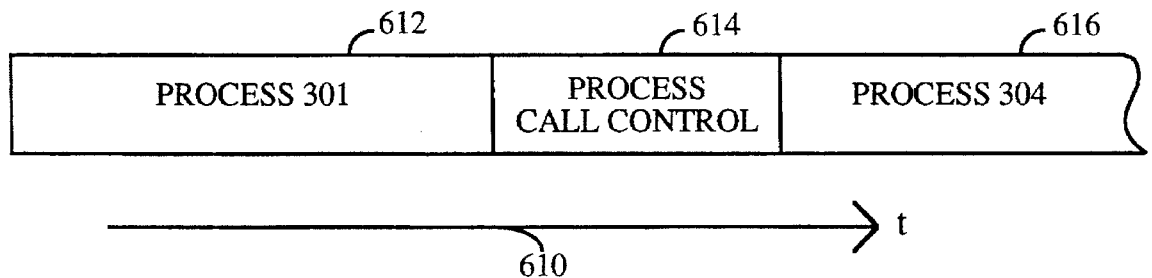
FIG. 10A illustrates a timing diagram of the present invention for processing the display list of FIG. 6A.
Figure 10B:
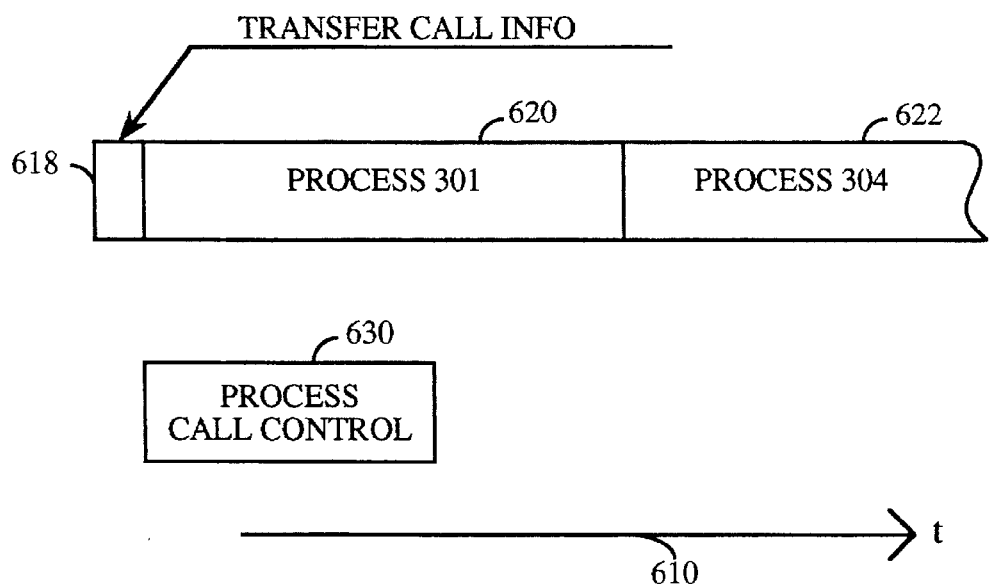
FIG. 10B illustrates a timing diagram of the present invention for processing the first portion of the display list of FIG. 8.

FIG. 10A and FIG. 10B illustrate the parallelism gained by the embodiment of FIG. 8 over the embodiment of FIG. 6A. FIG. 10A illustrates a timing diagram of the first DLS transfer of the embodiment of FIG. 6A. Time is indicated by dimension 610. Time block 612 represents the retrieval and processing of DLS 301 through the FIFO 260, parsing processor 250 and to graphics generation block 215. When the call control data 301a is encountered, time block 614 represents the processing of blocks 710 and 725 (FIG. 6C) performed by the information retrieval system 210 of the present invention. When complete, time block 616 represents the retrieval and processing of called DLS 304 through the FIFO 260, parsing processor 250 and to graphics generation block 215.

Since the control data 301a is located at the end of DLS 301, it is not encountered until the FIFO 260 is empty. While FIFO 260 is empty, time block 614 is performed. During this time, no graphics information is supplied to graphics generation block 215.

FIG. 10B illustrates a timing diagram of the first DLS transfer of the embodiment of FIG. 8. Time is indicated by dimension 610. Time block 618 indicates the period when call control data 301b is encountered by the parsing processor 250. Immediately, the call control data is fed to the DMA engine 240 and time block 630 represents the processing of blocks 755 and 765 (FIG. 6D) performed by the information retrieval system 210 of the present invention. Simultaneously, time block 620 is performed in parallel to process of DLS 301 through the FIFO 260, parsing processor 250 and to graphics generation block 215. Immediately after the completion of time block 620, the graphics information from DLS 304 is forwarded to FIFO 260 in time block 622 because the DMA engine 240 has already prepared this transfer back in time block 630. In actuality, block 622 starts as soon as an empty FIFO memory cell is available from FIFO 260.

In the embodiment of the present invention of FIG. 8, the FIFO 260 does not have to empty between DLS transfers and the graphics generation block 215 is constantly fed with graphics information for processing.

With reference to the above embodiments of the present invention, to maintain control flow given the set of hardware used, no pushes should be done in a DLS that ends with a return. Also, a DLS that contains at least one push and ends with a return is equivalent to a DLS containing one fewer push and ending with a jump to the DLS that would have been the subject of the final push.

Figure 9A:
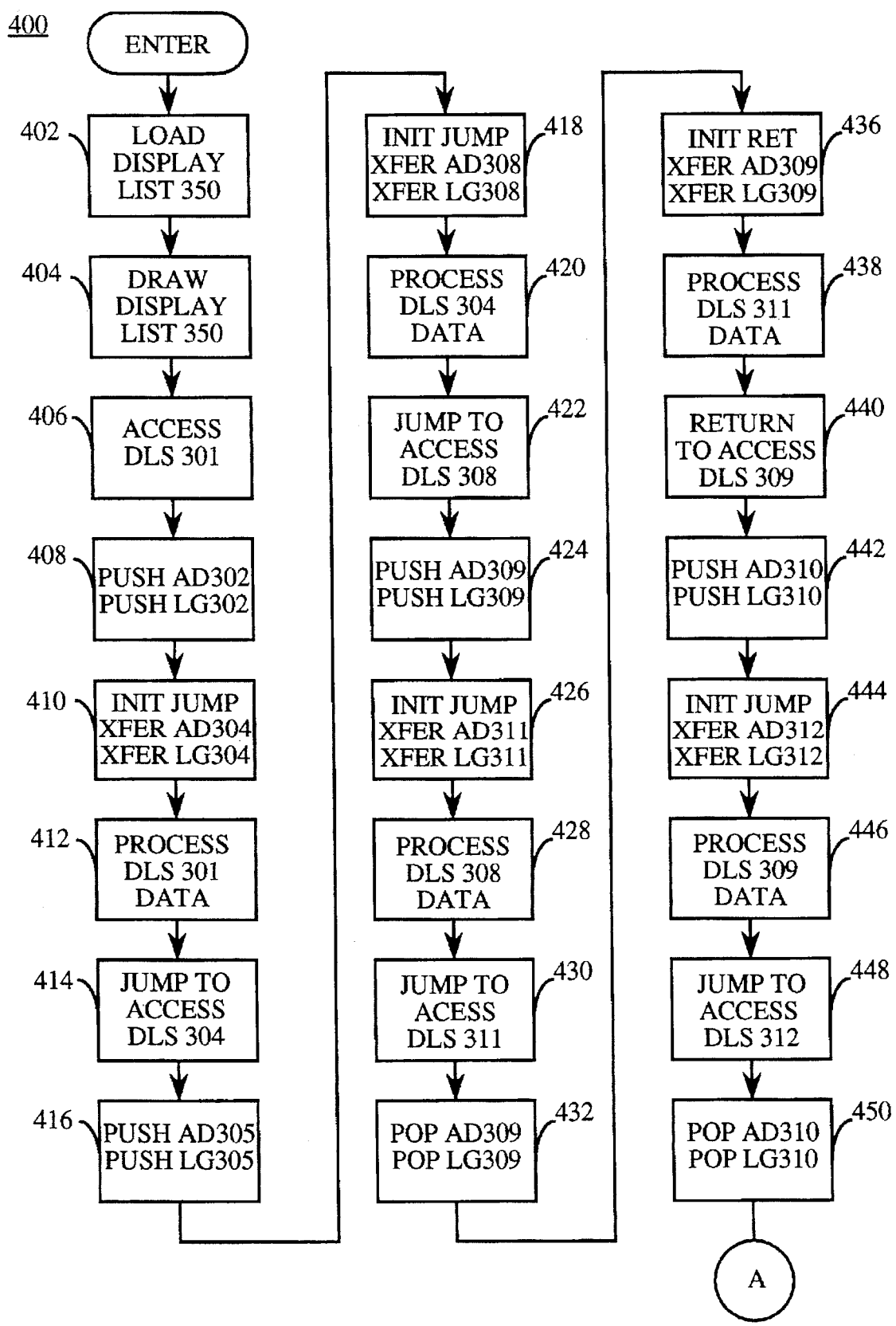
FIG. 9A, FIG. 9B, and FIG. 9C illustrate a flow chart executed by the information retrieval system of the present invention for processing the first portion of the display list of FIG. 8.
Figure 9B:
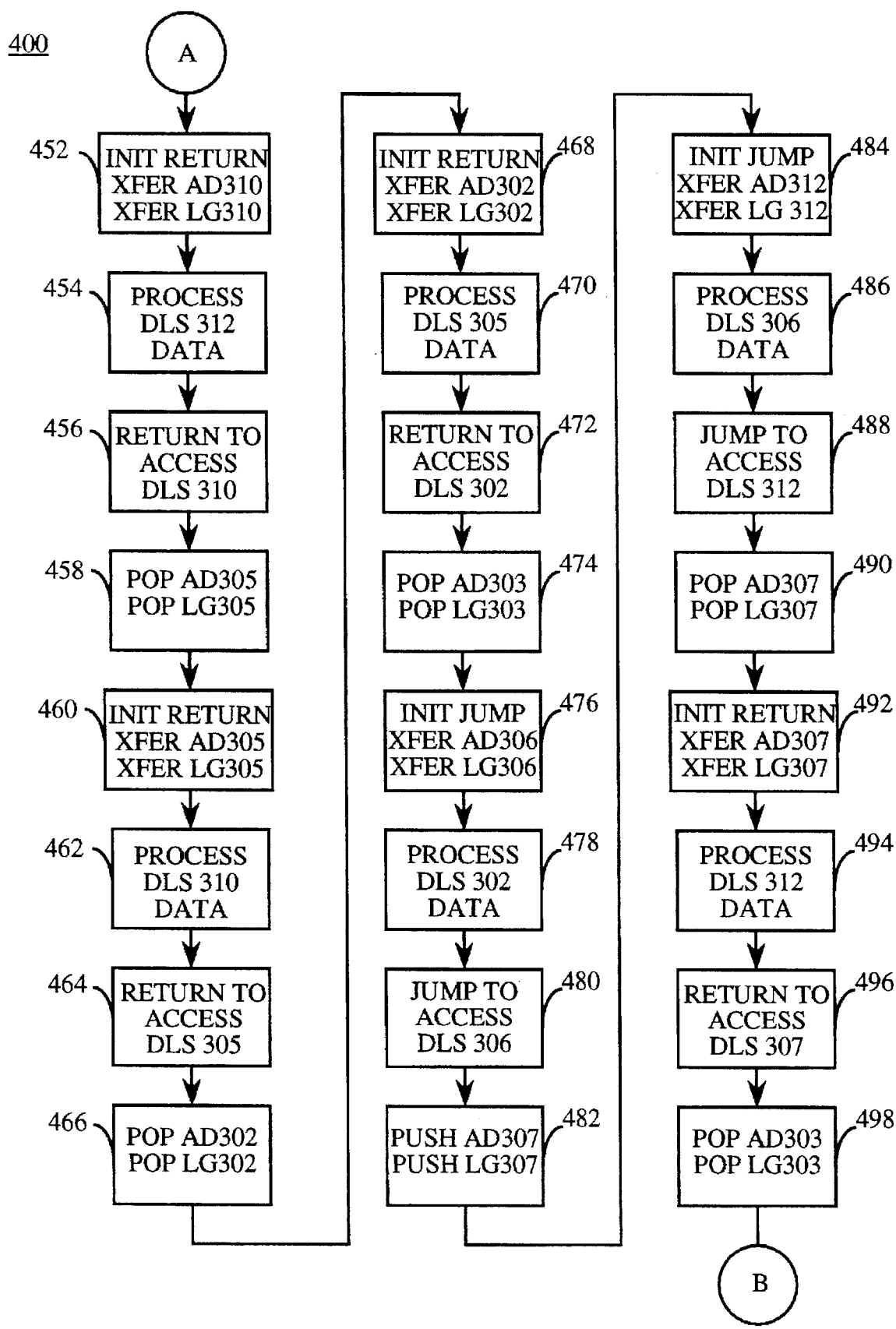
Figure 9C:
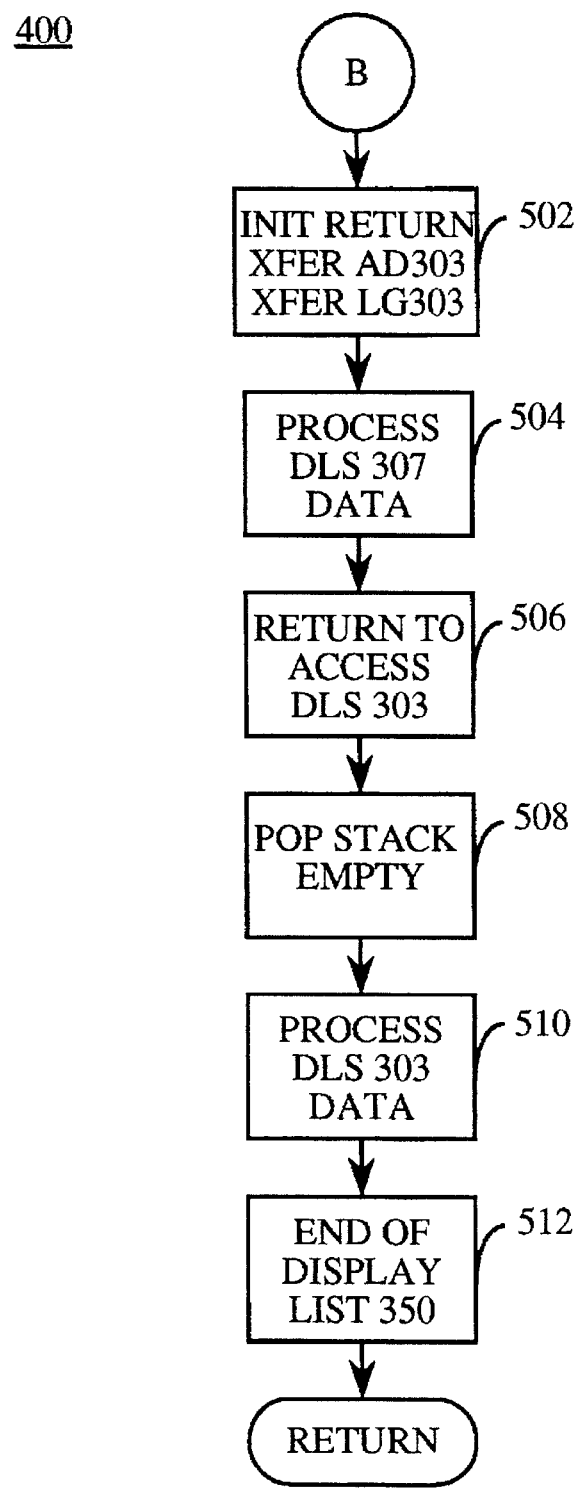

FIG. 9A, FIG. 9B and FIG. 9C illustrate the processing 400 performed by the graphics subsystem 109 of the present invention for processing the HDL 350 of FIG. 8.

With reference to FIG. 9A, at 402, the hierarchical display list (HDL) 350 is loaded into the memory subsystem 110. At 404, a command from the processor 101 is given over bus 100 to the graphics subsystem 109 indicating that HDL 350 is to be rendered on display screen 105. Included in this command is the starting address and length of the first DLS (e.g., 301) of HDL 350 which is fed to DMA engine 240. The processor 101 is thereafter not involved in process 400. In response to 404, process 406 instructs the DMA engine 240 to retrieve DLS 301 and supplies the graphics information to information retrieval system 210. At process 408, the call control word 301b is encountered by the parsing processor 250 and the address of next-to-return DLS 302 (AD302) and the length of DLS 302 (LG302) are pushed on DLstack 280. At block 410, the jump is initialized as the address and length of jump-to DLS 304 are transferred to the DMA engine 240. At block 412, the DMA engine 240 initializes for the next DLS (e.g., DLS 304) while the remainder of the graphics information from DLS 301 is processed through circuit 210 to circuit 215.

At block 414, the information of DLS 304 commences to fill FIFO 260 as soon as it contains empty memory from the end of DLS 301 passing through. At block 416, the call control word 304b is encountered and next-to-return AD305 and LG305 are pushed onto DLstack 280. At block 418, the jump is initialized as jump-to AD308 and LG308 are transferred to the DMA engine 240. At block 420, the DMA engine 240 initializes for the next DLS (e.g., DLS 308) while the remainder of the graphics information from DLS 304 is processed through circuit 210 to circuit 215.

At block 422 of FIG. 9A, the information of DLS 308 commences to fill FIFO 260 as soon as it contains empty memory from the end of DLS 304 passing through. At block 424, the call control word 308b is encountered and next-to-return AD309 and LG309 are pushed onto DLstack 280. At block 426, the jump is initialized as jump-to AD311 and LG311 are transferred to the DMA engine 240. At block 428, the DMA engine 240 initializes for the next DLS (e.g., DLS 311) while the remainder of the graphics information from DLS 308 is processed through circuit 210 to circuit 215.

At block 430, the information of DLS 311 commences to fill FIFO 260 as soon as it contains empty memory from the end of DLS 308 passing through. At block 432, the return control word 311b is encountered and return AD309 and LG309 are popped off the DLstack 280. At block 436, the return jump is initialized as return AD309 and LG309 are transferred to the DMA engine 240. At block 438, the DMA engine 240 initializes for the next DLS (e.g., DLS 309) while the remainder of the graphics information from DLS 311 is processed through circuit 210 to circuit 215.

At block 440 of FIG. 9A, the information of DLS 309 commences to fill FIFO 260 as soon as it contains empty memory from the end of DLS 311 passing through. At block 442, the call control word 309b is encountered and next-to-return AD310 and LG310 are pushed onto the DLstack 280. At block 444, the call jump is initialized as jump-to AD312 and LG312 are transferred to the DMA engine 240. At block 446, the DMA engine 240 initializes for the next DLS (e.g., DLS 312) while the remainder of the graphics information from DLS 309 is processed through circuit 210 to circuit 215.

At block 448 of FIG. 9A, the information of DLS 312 commences to fill FIFO 260 as soon as it contains empty memory from the end of DLS 309 passing through. At block 450, the return control word 312b is encountered and return AD310 and LG310 are popped off the DLstack 280. At block 452 of FIG. 9B, the return jump is initialized as return AD310 and LG310 are transferred to the DMA engine 240. At block 454, the DMA engine 240 initializes for the next DLS (e.g., DLS 310) while the remainder of the graphics information from DLS 312 is processed through circuit 210 to circuit 215.

At block 456 of FIG. 9B, the information of DLS 310 commences to fill FIFO 260 as soon as it contains empty memory from the end of DLS 312 passing through. At block 458, the return control word 310b is encountered and return AD305 and LG305 are popped off the DLstack 280. At block 460, the return jump is initialized as return AD305 and LG305 are transferred to the DMA engine 240. At block 462, the DMA engine 240 initializes for the next DLS (e.g., DLS 305) while the remainder of the graphics information from DLS 310 is processed through circuit 210 to circuit 215.

At block 464, the information of DLS 305 commences to fill FIFO 260 as soon as it contains empty memory from the end of DLS 310 passing through. At block 466, the return control word 305b is encountered and return AD302 and LG302 are popped off the DLstack 280. At block 468, the return jump is initialized as return AD302 and LG302 are transferred to the DMA engine 240. At block 470, the DMA engine 240 initializes for the next DLS (e.g., DLS 302) while the remainder of the graphics information from DLS 305 is processed through circuit 210 to circuit 215.

At block 472 of FIG. 9B, the information of DLS 302 commences to fill FIFO 260 as soon as it contains empty memory from the end of DLS 305 passing through. At block 474, the call control word 302b is encountered and next-to-return AD303 and LG303 are pushed onto the DLstack 280. At block 476, the call jump is initialized as jump-to AD306 and LG306 are transferred to the DMA engine 240. At block 478, the DMA engine 240 initializes for the next DLS (e.g., DLS 306) while the remainder of the graphics information from DLS 302 is processed through circuit 210 to circuit 215.

At block 480, the information of DLS 306 commences to fill FIFO 260 as soon as it contains empty memory from the end of DLS 302 passing through. At block 482, the call control word 306b is encountered and next-to-return AD307 and LG307 are pushed onto the DLstack 280. At block 484, the call jump is initialized as jump-to AD312 and LG312 are transferred to the DMA engine 240. At block 486, the DMA engine 240 initializes for the next DLS (e.g., DLS 312) while the remainder of the graphics information from DLS 306 is processed through circuit 210 to circuit 215.

At block 488 of FIG. 9B, the information of DLS 312 commences to fill FIFO 260 as soon as it contains empty memory from the end of DLS 306 passing through. At block 490, the return control word 312b is encountered and return AD307 and LG307 are popped off the DLstack 280. At block 492, the return jump is initialized as return AD307 and LG307 are transferred to the DMA engine 240. At block 494, the DMA engine 240 initializes for the next DLS (e.g., DLS 307) while the remainder of the graphics information from DLS 312 is processed through circuit 210 to circuit 215.

At block 492, the information of DLS 307 commences to fill FIFO 260 as soon as it contains empty memory from the end of DLS 312 passing through. At block 498, the return control word 307b is encountered and return AD303 and LG303 are popped off the DLstack 280. At block 502 of FIG. 9C, the return jump is initialized as return AD303 and LG303 are transferred to the DMA engine 240. At block 504, the DMA engine 240 initializes for the next DLS (e.g., DLS 303) while the remainder of the graphics information from DLS 307 is processed through circuit 210 to circuit 215.

At block 506 of FIG. 9C, the return control word 303b is encountered and the DLstack 280 is popped and returns empty at block 508. At block 510 the remainder of the graphics information of DLS 303 is processed through circuit 210 to circuit 215. At block 512, the HDL 350 is complete due to the indication of block 508.

The preferred embodiment of the present invention, a hierarchical display list system and efficient processing method for same, is thus described. While the present invention has been described in particular embodiments, it should be appreciated that the present invention should not be construed as limited by such embodiments, but rather construed according to the below claims.

What is claimed is:

1. A method for processing a display list stored in a memory unit, said method comprising the steps of:

(a) retrieving a first display list segment of said display list from said memory unit, said display list comprising a plurality of display list segments linked together under a hierarchical acyclic directed graph format, said step of retrieving using a memory transfer engine coupled to control said memory unit;

(b) interrogating said contents of said first display list segment for a call control data and for a return control data;

(c) upon encountering a call control data, (1) pushing an address and length of a second display list segment from said call control data onto a stack memory and (2) transferring an address and length of a third display list segment from said call control data to said memory transfer engine; and (d) upon encountering a return control data word, (1) popping an address and length of a fourth display list segment from said stack memory and (2) transferring said address and length of said fourth display list to said memory transfer engine.

2. A method as described in claim 1 including control data comprising either said call control data or said return control data and wherein said control data is located at the end of each of said plurality of display list segments of said display list and wherein said memory transfer engine is a DMA engine.

3. A method as described in claim 1 including control data comprising either said call control data or said return control data and wherein said control data is located at the front of each of said plurality of display list segments of said display list and wherein said memory transfer engine is a DMA engine.

4. A method as described in claim 3 further comprising the steps of:

supplying information from said first display list segment to a graphics generation circuit for visualization; and initializing retrieval of said third display list segment using said memory transfer engine upon receiving said address and length of said third display list segment, wherein said above step of supplying and said above step of initializing operate in parallel.

5. A method as described in claim 3 further comprising the steps of:

supplying information from said first display list segment to a graphics generation circuit for visualization; and retrieving said fourth display list segment using said memory transfer engine upon receiving said address and length of said fourth display list segment, wherein said above step of retrieving and said above step of initializing operate in parallel.

6. A method as described in claim 4 wherein said display list represents graphics information for display on a display screen and wherein said graphics information comprises graphics primitives.

7. A method as described in claim 1 wherein said step of (d) comprises the steps of:

determining if said stack memory is empty after said step of popping an address and length of said fourth display list segment from said stack memory; and ending processing of said plurality of display list segments of said display list if said stack memory is determined to be empty by said above step of determining.

8. In a graphics display system having a host processor, a memory transfer engine, a graphics generator circuit, a memory unit, and a stack memory, a method for reading a display list comprising the steps of:

(a) retrieving an input display list segment of said display list from said memory unit, said display list comprising a plurality of display list segments linked together under a hierarchical acyclic directed graph format, said step of retrieving using said memory transfer engine coupled to control said memory unit;

(b) interrogating contents of said input display list to locate control data therein, said control data comprising either a call control data or a return control data for said input display list segment;

(c) if said control data includes said call control data, (1) pushing an address and length of a next-to-return display list segment from said call control data onto said stack memory and (2) transferring an address and length of a jump-to display list segment from said call control data to said memory transfer engine; and (d) if said control data includes a return control data word, (1) popping an address and length of a return display list segment from said stack memory and (2) transferring said address and length of said return display list to said memory transfer engine.

9. A method as described in claim 8 wherein said control data is located at the end of each of said plurality of display list segments of said display list.

10. A method as described in claim 8 wherein said control data is located at the front of each of said plurality of display list segments of said display list.

11. A method as described in claim 10 further comprising the steps of:

supplying information from said input display list segment to a graphics generation circuit for visualization; and retrieving said jump-to display list segment using said memory transfer engine upon receiving said address and length of said jump-to display list segment, wherein said above step of supplying and said above step of retrieving said jump-to-display list operation in parallel.

12. A method as described in claim 11 wherein said step of receiving an input display list comprises the step of receiving said input display list into a FIFO memory unit and further comprising the step of:

preventing said FIFO from emptying by receiving said jump-to display list into said FIFO memory unit just as memory is made available in said FIFO memory unit from said input display list segment exiting said FIFO memory unit.

13. A method as described in claim 11 wherein said display list represents graphics information for display on a display screen, wherein said graphics information comprises graphics primitives and wherein said memory transfer engine is a DMA engine.

14. A method as described in claim 10 further comprising the steps of:

supplying information from said input display list segment to a graphics generation circuit for visualization; and initializing retrieval of said jump-to display list segment using said memory transfer engine upon receiving said address and length of said jump-to display list segment, wherein said above step of supplying and said above step of initializing operate in parallel.

15. A method as described in claim 10 further comprising the steps of:

supplying information from said input display list segment to a graphics generation circuit for visualization; and initializing retrieval of said return display list segment using said memory transfer engine upon receiving said address and length of said return display list segment, wherein said above step of supplying and said above step of initializing operate in parallel.

16. A method as described in claim 8 wherein said step of (d) comprises the steps of:

determining if said stack memory is empty after said step of popping an address and length of said return display list segment from said stack memory; and ending processing of said plurality of display list segments of said display list if said stack memory is determined to be empty by said above step of determining.

17. A graphics display system for generating an image represented by graphics information of a display list, said system comprising:

a host processor coupled to communicate with a memory unit;

a stack memory;

an information retrieval circuit comprising a FIFO memory for retrieving an input display list segment of said display list from said memory unit, said display list comprising a plurality of display list segments linked together under a hierarchical acyclic directed graph format;

said information retrieval circuit also comprising a parsing processor for interrogating said input display list to locate control data therein, said control data comprising either a call control data or a return control data for said input display list segment; and control logic for determining if said control data includes said call control data, and if so, (1) for pushing an address and length of a next-to-return display list segment from said call control data onto said stack memory and (2) for transferring an address and length of a jump-to display list segment from said call control data to a retrieval circuit, said control logic also for determining if said control data includes said return control data word, and if so, (1) for popping an address and length of a return display list segment from said stack memory and (2) for transferring said address and length of said return display list to said retrieval circuit.

18. A system as described in claim 17 wherein said control data is located at the end of each of said plurality of display list segments of said display list.

19. A system as described in claim 17 wherein said control data is located at the front of each of said plurality of display list segments of said display list.

20. A system as described in claim 19 wherein said parsing processor supplies information from said input display list segment to a graphics generation circuit for visualization while said retrieval circuit initializes retrieval of said jump-to display list segment upon said retrieval circuit receiving said address and length of said jump-to display list segment.

21. A system as described in claim 20 wherein said graphics information of said display list comprises graphics primitives and wherein said retrieval circuit is a DMA retrieval circuit.

22. A system as described in claim 19 wherein said parsing processor supplies information from said input display list segment to a graphics generation circuit for visualization while said retrieval circuit initializes retrieval of said return display list segment upon said retrieval circuit receiving said address and length of said return display list segment.

* * * * *